United States Patent
Hemmersmeier

(10) Patent No.: US 8,210,298 B2
(45) Date of Patent: Jul. 3, 2012

(54) DEVICE FOR FIXING A HEAT TRANSFER DEVICE, IN PARTICULAR A COOLANT RADIATOR FOR MOTOR VEHICLES

(75) Inventor: Ralf Hemmersmeier, Lippstadt (DE)

(73) Assignee: HPBO GmbH, Lippstadt (DE)

( * ) Notice: Subject to any disclaimer, the term of this patent is extended or adjusted under 35 U.S.C. 154(b) by 348 days.

(21) Appl. No.: 11/574,850

(22) PCT Filed: Nov. 5, 2004

(86) PCT No.: PCT/EP2004/012531
§ 371 (c)(1),
(2), (4) Date: Mar. 7, 2007

(87) PCT Pub. No.: WO2006/027024
PCT Pub. Date: Mar. 16, 2006

(65) Prior Publication Data
US 2008/0061601 A1      Mar. 13, 2008

(30) Foreign Application Priority Data
Sep. 8, 2004  (DE) .......................... 10 2004 043 354

(51) Int. Cl.
*B60K 11/04* (2006.01)
(52) U.S. Cl. ..................................... 180/68.4
(58) Field of Classification Search ................ 180/68.4, 180/68.6; 248/634, 635; 296/203.02, 193.09
See application file for complete search history.

(56) References Cited

U.S. PATENT DOCUMENTS

| | | | | |
|---|---|---|---|---|
| 4,261,151 A | * | 4/1981 | Ito | 52/507 |
| 4,417,635 A | * | 11/1983 | Thepault | 180/68.4 |
| 4,742,881 A | | 5/1988 | Kawaguchi et al. | |
| 4,770,234 A | * | 9/1988 | Hiraoka et al. | 165/69 |
| 5,785,140 A | * | 7/1998 | Suzuki et al. | 180/68.4 |
| 6,364,403 B1 | | 4/2002 | Ozawa et al. | |
| 6,386,497 B1 | | 5/2002 | Guyomard et al. | |
| 6,571,898 B2 | * | 6/2003 | Guyomard | 180/68.4 |
| 6,712,571 B2 | * | 3/2004 | Krohlow et al. | 411/45 |
| 6,742,615 B2 | * | 6/2004 | Cristante et al. | 180/68.4 |
| 7,036,617 B2 | * | 5/2006 | Harada | 180/68.4 |
| 2002/0063003 A1 | * | 5/2002 | Cristante et al. | 180/68.4 |
| 2002/0157885 A1 | * | 10/2002 | Brown | 180/68.4 |
| 2003/0146030 A1 | * | 8/2003 | Harada | 180/68.4 |
| 2004/0089769 A1 | | 5/2004 | Carrier et al. | |

FOREIGN PATENT DOCUMENTS

| | | |
|---|---|---|
| DE | 36 13 955 A1 | 10/1986 |
| DE | 43 35 813 C1 | 11/1994 |
| DE | 100 51 567 A1 | 4/2001 |
| JP | 2-158418 A | 6/1990 |
| JP | 9-249035 A | 9/1997 |

* cited by examiner

*Primary Examiner* — Frank Vanaman
(74) *Attorney, Agent, or Firm* — Foley & Lardner LLP

(57) ABSTRACT

A device for fixing a heat transfer device, in particular a coolant radiator (3), in the frame-type assembly support (2) of a front end module (1) for a motor vehicle. Said assembly support (2) comprises an upper crossmember (2a), two lateral parts (2c, 2d) and preferably a lower crossmember (2b) and the heat transfer device (3) essentially has four bearings (9, 10, 11, 12), which are elastically supported on the assembly support (2). The heat transfer device (3) is provided with bearing journals, which are held in elastically deformable bushings. The two upper bearings (11, 12) comprise intermediate supports, which hold the bushings and can be fixed to the assembly support (2) without additional auxiliary elements.

14 Claims, 7 Drawing Sheets

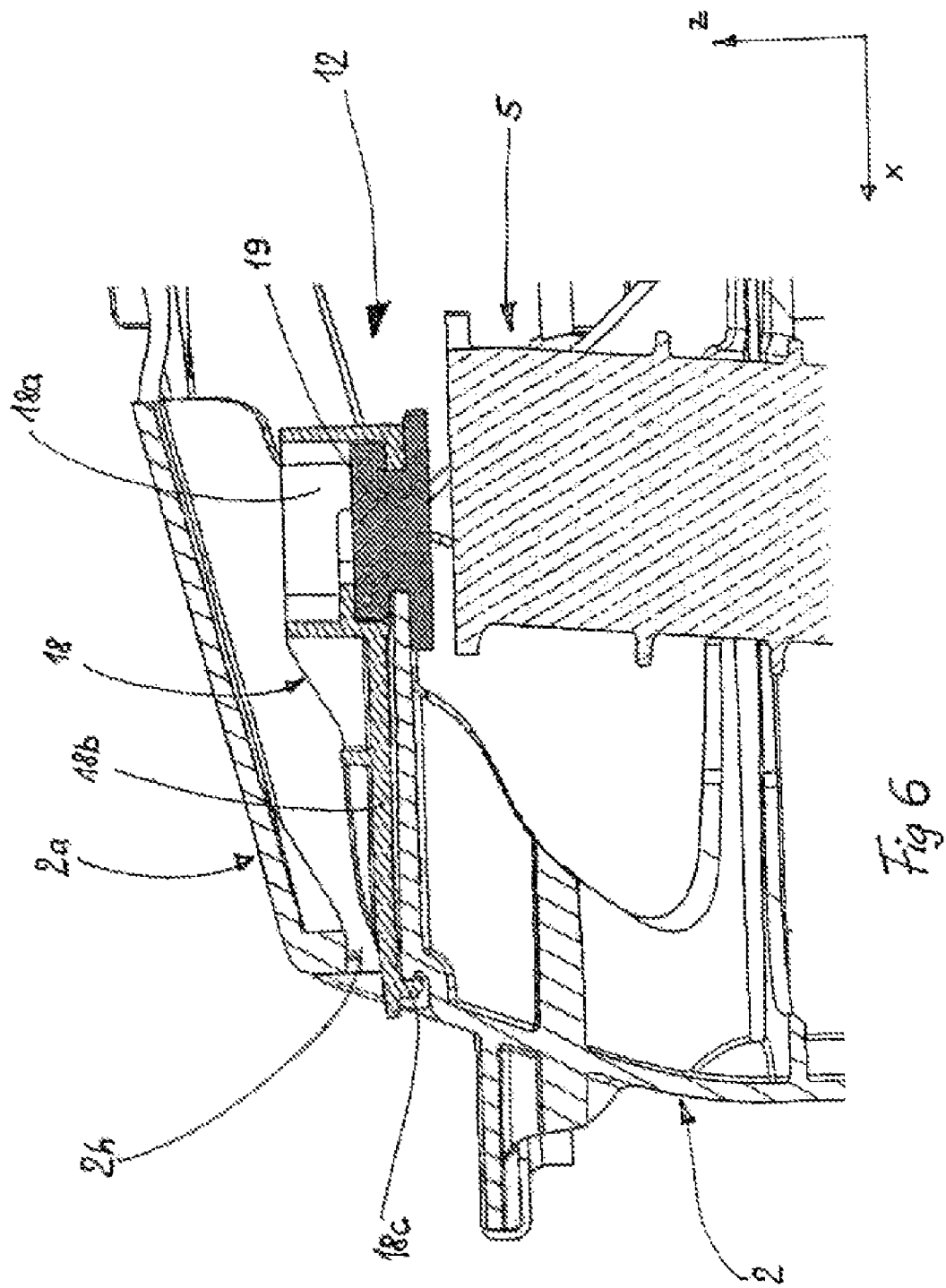

DEVICE FOR FIXING A HEAT TRANSFER DEVICE, IN PARTICULAR A COOLANT RADIATOR FOR MOTOR VEHICLES

CROSS REFERENCE TO RELATED APPLICATIONS

This application is the national stage of PCT Application Number PCT/EP2004/012531, filed Nov. 5, 2004, with the title "Vorrichtung Zur Befestigung Eines Waermeuebertragers, Insbesondere Eines Kuehlmittelkuehlers Fuer Kraftfarhrzeuge" which in turn claims priority to German Application 10 2004 043 354.2, filed Sep. 8, 2004, having the same title.

The invention relates to a device for fastening a heat exchanger, in particular a coolant radiator.

BACKGROUND

Heat exchangers for motor vehicles, in particular coolant radiators and refrigerant condensers, are nowadays often installed in a so-called front module composed of an assembly support, the heat exchangers and headlamps. Here, the assembly support forms a substantially frame-like structure, made in particular from plastic, to which the individual components such as heat exchangers, a fan frame and a fan are fastened. The entire front module, after having been assembled, is inserted into the front of the engine bay of the motor vehicle and is fastened there.

A front module of said type having a frame-like assembly support is known from DE 100 51 567 A1, in which front module a coolant radiator is fastened together with a condenser. Rubber bushes are attached by means of pins to the top side and the bottom side of the radiator, which rubber bushes are inserted directly into corresponding openings of the assembly support. Keyhole-like openings, that is to say slots, are provided in the upper transverse member of the assembly support, into which slots the upper rubber bushes, which are of drum-shaped design, are inserted. The radiator is therefore mounted from behind, that is to say from the engine side, and can also only be dismounted from the rear side, which is disadvantageous as a result of the restricted space conditions. In addition, said type of mounting is statically indeterminate, since the upper and lower mounts are braced towards one another—this can lead to undesired vibrations and increased loading of the front module.

SUMMARY

It is an object of the present invention to improve a device of the type specified in the introduction in such a way that, on the one hand, simplified mounting and dismounting of the heat exchanger, in particular of the coolant radiator, is possible, and, on the other hand, a statically determinate mounting arrangement is obtained.

It is provided according to the invention that the heat exchanger or coolant radiator is connected at the top by means of auxiliary brackets, so-called intermediate brackets, to the assembly support. The radiator therefore has two intermediate brackets which are placed on mounting pins of the radiator and are assembled with the latter. The intermediate brackets thereby form connecting elements between the radiator and the assembly support, which connecting elements are adapted to the installation conditions. In addition, this makes it possible to simplify the heat exchanger or radiator in that the latter need merely have standardized mounting pins, onto which are placed the intermediate brackets which are adapted to the respective application.

According to one advantageous refinement of the invention, an intermediate bracket is composed on the one hand of a fastening eye which holds a bush made from an elastomeric material, that is to say a rubber bush, and on the other hand of retaining fingers which can be latched to the assembly support. This provides simple, fast assembly, since the radiator must merely be pivoted into place and latched. The intermediate brackets thereby form upper radiator mounts which become constituent parts of the assembly support and introduce all mount forces proceeding from the upper mounting pins into the assembly support.

According to a further advantageous refinement of the invention, the two retaining fingers are arranged approximately perpendicularly with respect to the longitudinal axis of the upper mounting pins, that is to say they project approximately horizontally forward, that is to say in the direction of travel, from the radiator. The radiator can therefore, without requiring additional installation space in the upward direction (z direction), be mounted by being pivoted into place and latched. Here, the ends of the retaining fingers extend through the front side of the assembly support, in which corresponding latching openings are provided, with the retaining fingers latching into said latching openings. The latching action primarily provides fixing in the direction of travel (x direction).

In a further advantageous refinement of the invention, each bracket is supported, preferably clamped, at the top and at the bottom, that is to say in the positive and in the negative z direction, relative to the assembly support. This provides the advantage that the bracket is fixedly connected without play to the assembly support despite the simple assembly process by means of latching. A further resulting advantage is that the radiator can be dismounted from the front, in that it is necessary merely to release the two latching fingers from their latched positions by means of a simple tool. The upper radiator mounts are thereby released, and the radiator can be tilted backward (counter to the direction of travel) and removed. This considerably facilitates dismounting in the event of repair work.

In a further advantageous embodiment of the invention, auxiliary bores are provided on the brackets, into which screws can be inserted as an auxiliary measure. This is a fail-safe measure for the case in which the latching connection fails. The radiator is then still connected reliably to the assembly support by means of the screw connection produced as an auxiliary measure.

In a further advantageous embodiment of the invention, the bracket is embodied as a plastic injection-molded part, bringing with it the advantage of low production costs.

In a further advantageous embodiment of the invention, at least one bush of the upper radiator mount has a slot, so as to permit a degree of play transversely with respect to the direction of travel. Longitudinal expansion (of the horizontally aligned tubes) of the radiator is therefore not impeded by the mounts, and stresses are avoided.

In a further advantageous embodiment of the invention, the lower mounts are embodied as fixed mounts and the upper mounts are embodied as floating mounts. The radiator therefore rests with its weight on the lower mounts which are embodied as rubber bushes and therefore have both resilient and damping properties. A degree of play is permitted between the radiator and the intermediate brackets in the upward direction, so that expansions in the z direction are possible. This obtains the advantage of statically determinate mounting for the radiator and the entire cooling module.

BRIEF DESCRIPTION OF THE DRAWINGS

One exemplary embodiment of the invention is illustrated in the drawing and is described in more detail in the following. In the drawing:

FIG. 6 shows a further section through the upper radiator mount in a parallel x-z plane.

DETAILED DESCRIPTION

Figure 1:
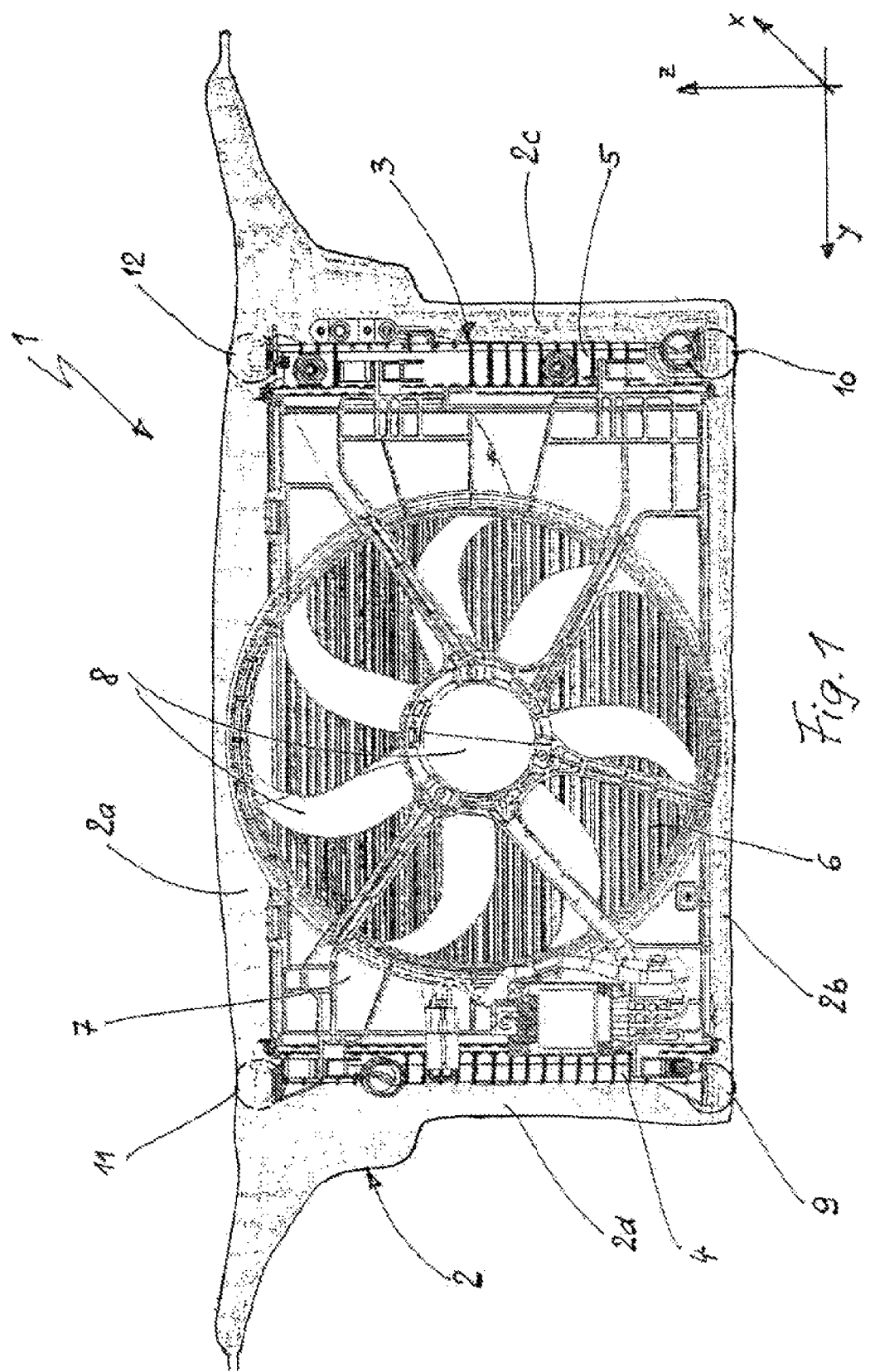
FIG. 1 shows a view from the rear (in the direction of travel) of a front end module.

FIG. 1 shows a front end module 1 of a motor vehicle in a view from the rear, that is to say in the direction of travel of the motor vehicle. The positive axes x, y, z for the vehicle are illustrated on a coordinate system, with x corresponding to the direction of travel. The front end module 1 has an assembly support 2 which forms a closed frame composed of an upper transverse member 2a, a lower transverse member 2b and two side parts 2c, 2d. A coolant radiator 3 is mounted in the assembly support 2, that is to say within the frame 2a, 2b, 2c, 2d, said coolant radiator 3 being embodied as a crossflow radiator and having two lateral coolant tanks 4, 5 with a mesh 6 arranged between the two coolant tanks 4, 5. The mesh 6 is composed of horizontally arranged tubes and fins (not indicated). A fan cowling 7 with a fan impeller 8 is fastened behind the coolant radiator 3 in the direction of travel. The radiator 3 is supported relative to the assembly support 2 by means of four mounts, two lower mounts 9, 10 and two upper mounts 11, 12, which are illustrated schematically by circles. Here, the radiator 3 is the support of a cooling module which comprises the fan cowling 7 and the fan impeller 8 as well as further heat exchangers not shown here.

Figure 2:
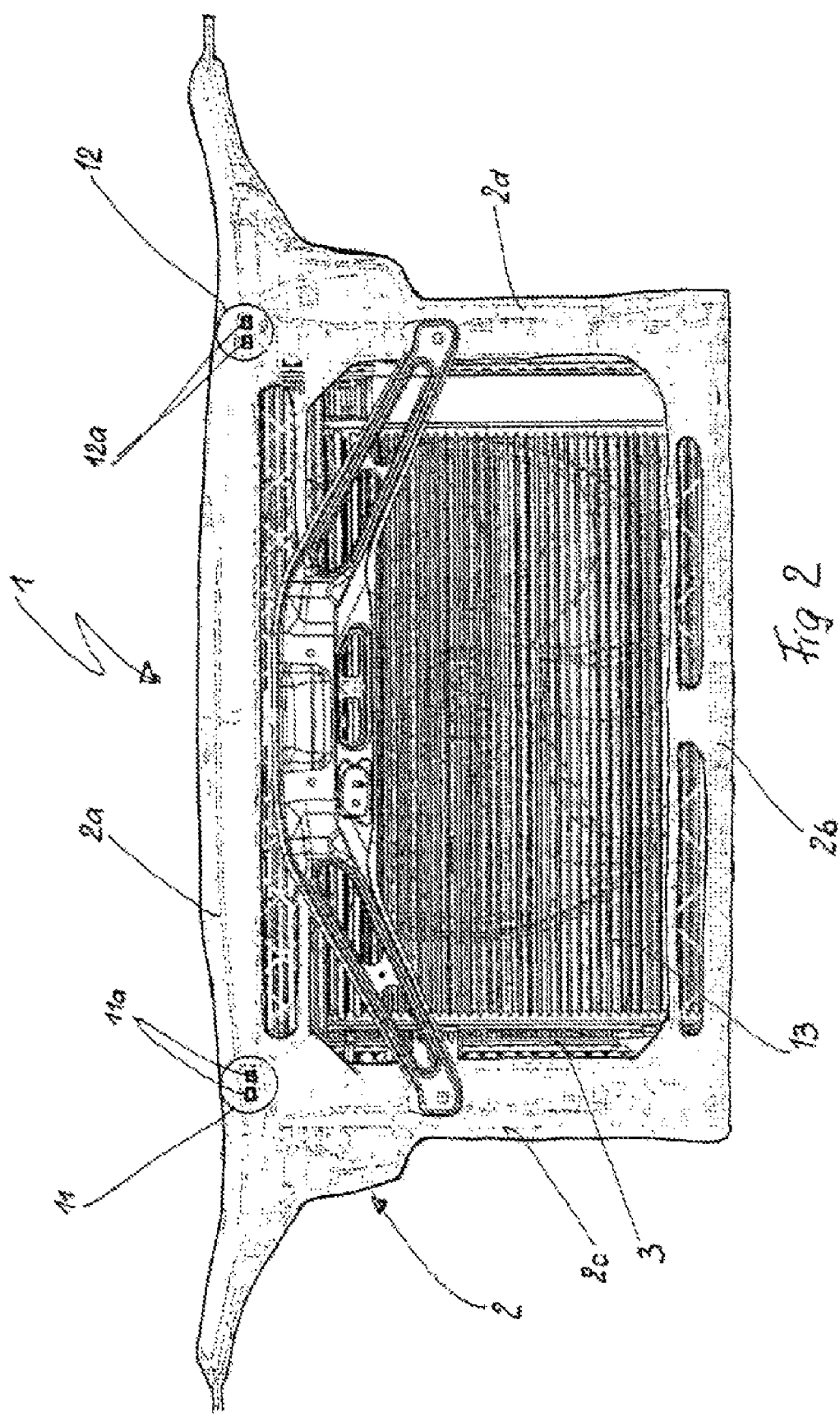
FIG. 2 shows a view from the front (counter to the direction of travel) of the front end module as per FIG. 1.

FIG. 2 shows the front end module 1 as per FIG. 1 with the assembly support 2 in a view from the front, that is to say counter to the direction of travel of the motor vehicle. A condenser 13 for an air conditioning system is arranged in front of the radiator 3 in the direction of travel, and is connected to the radiator 3 in a way not described in any more detail. The two upper mounts 11, 12, illustrated schematically by circles, have in each case two latching elements 11a, 12a which are inserted through the front side of the upper transverse member and are explained in more detail below.

Figure 3:
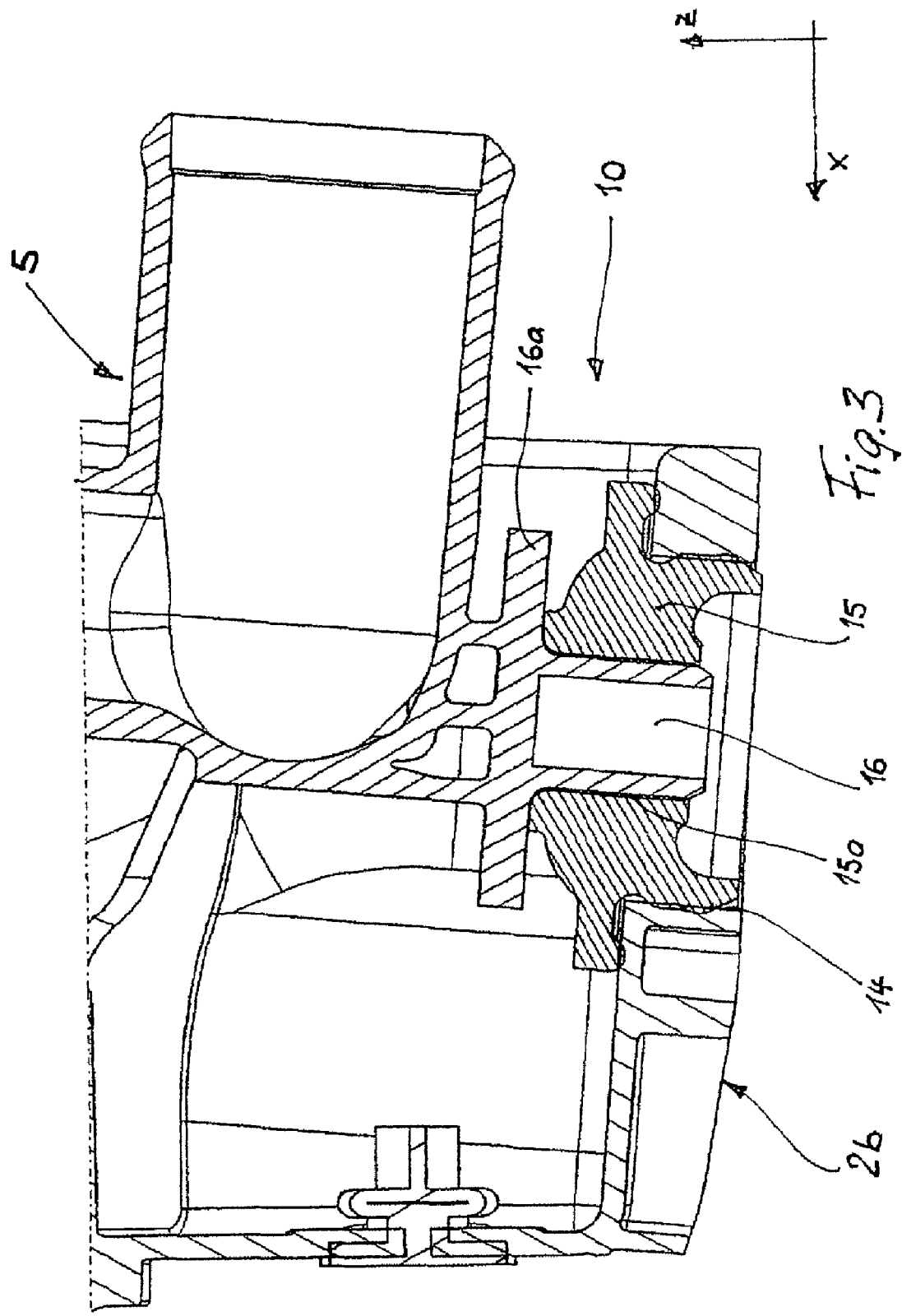
FIG. 3 shows a lower mount for a coolant radiator in an assembly support.

FIG. 3 shows the lower radiator mount 10 (cf. FIG. 1) in a section in an x-z plane. The drawing shows the lower transverse member 2b which has an opening 14 for receiving a rubber bush 15. The plastic coolant tank 5 of the coolant radiator 3 has, in its lower region, an integrally injection-molded mounting pin 16 which is pressed into an opening 15a of the rubber bush 15. The rubber bush 15 has a peripheral flange 15b which is supported on the transverse member 2b. The mounting pin of the coolant tank 5 is upwardly delimited by a plate 16a which rests on the rubber bush 15. The latter is arched upward in the shape of a dome, so as to provide a degree of spring travel for the mounting pin 16 together with the stop plate 16a in the z direction relative to the transverse member 2b. At the same time, a vibration damping action is provided by the rubber bush 15 which is fixedly connected both to the transverse member 2b and to the mounting pin 16 by means of a press fit. The lower radiator mount 9 is of substantially identical design, that is to say is likewise designed in the z direction as an elastic fixed bearing and is therefore not illustrated in section.

Figure 4:
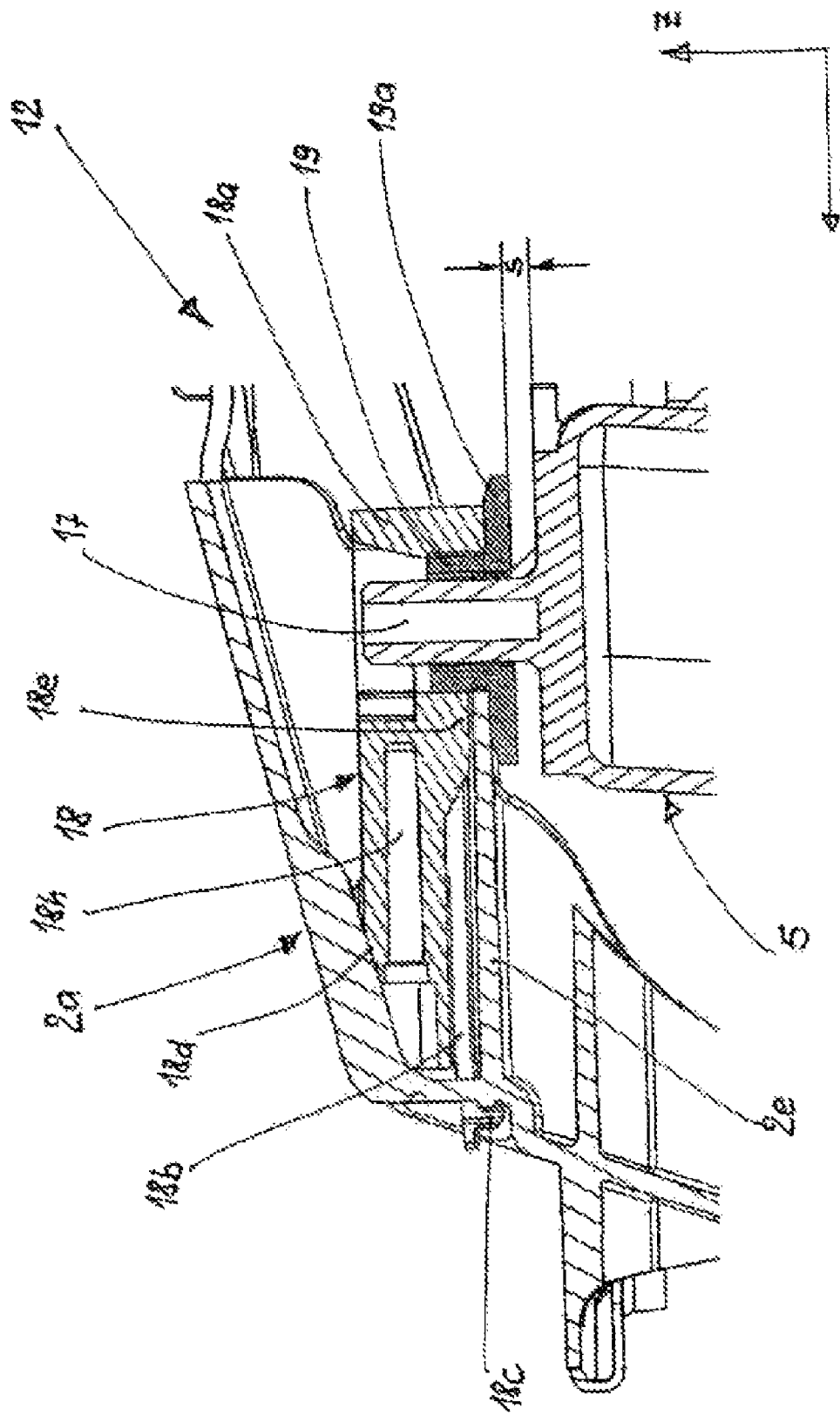
FIG. 4 shows an upper mount for the coolant radiator by means of intermediate brackets in a section in an x-z plane.

FIG. 4 shows the upper radiator mount 12 in a section in an x-z plane—the upper radiator mount 11 is of substantially identical design, that is to say the following description also applies to the other upper radiator mount. The coolant tank 5 has an integrally injection-molded mounting pin 17 which projects approximately vertically (z direction) upwards. An intermediate bracket 18 is latched and clamped into the upper transverse member 2a, which intermediate bracket extends approximately in the horizontal direction (in the x direction) and has a fastening eye 18a. The intermediate bracket 18 holds the mounting pin 17 by means of a rubber bush 19 in the fastening eye 18a, and forms the upper mount for said mounting pin 17. The rubber bush 19 is held in a positively locking fashion in the fastening eye 18a and has a lower flange 19a which forms a gap s relative to the upper side of the coolant tank 5—this permits a compensating movement of the coolant tank 5 or of the coolant radiator 3 in the z direction, for example as a result of thermal expansion. The intermediate bracket 18 is—as mentioned—fixedly connected to the assembly support 2 and thereby transmits forces introduced by the mounting pin 17 onto the assembly support 2. For this purpose, the intermediate bracket 18 has retaining or latching fingers 18b which extend through the front side of the transverse member 2a and engage behind the latter with a latching lug 18c. This provides fixing of the intermediate bracket 18 in the x direction. Fixing is provided in the opposite x direction by an inclined stop face 18d which is supported against the inner side of the upper transverse member 2a. Further support of the retaining finger 18 is provided by means of an intermediate rib 2e and a support lug 18e on the intermediate bracket 18.

The sectioned illustration also shows an auxiliary bore 18h which is arranged centrally in the intermediate bracket 18 and is open toward the front. For the case in which the latching connection fails, a fastening screw can be inserted into the auxiliary bore 18h from the front side in order to produce an auxiliary fastening (fail-safe).

Figure 5:
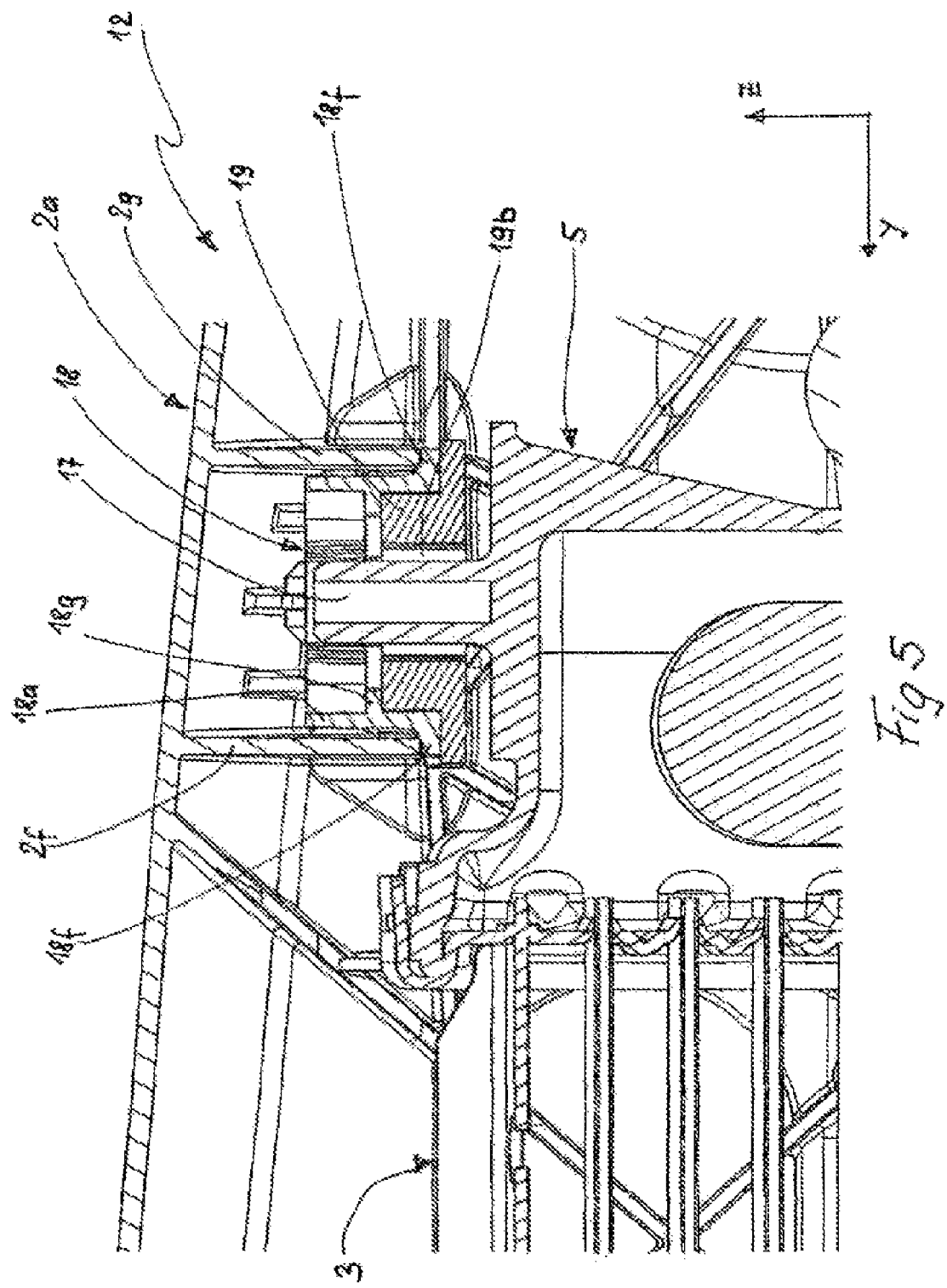
FIG. 5 shows the upper radiator mount as per FIG. 4 in a section in a y-z plane.

FIG. 5 shows a further section through the upper radiator mount in a y-z plane. The fastening eye 18a of the intermediate bracket 18 has, in its lower and outer region, a flange 18f which is supported in the upward direction (in the z direction) against two vertical ribs 2f, 2g which project from the upper transverse member 2a. This provides fixing of the intermediate bracket 18 in the upward direction. The rubber bush 19 is held in a positively locking manner in the fastening eye 18a and is fixed in the upward direction by means of a radially inwardly projecting collar 18g. The rubber bush 19 has a slot 19b which permits a degree of play of the mounting pin 17 in the y direction, that is to say transversely with respect to the direction of travel. Thermal expansions of the coolant radiator 3 can thereby be compensated.

FIG. 6 shows a further section through the upper radiator mount 12 in an x-z plane, outside the pin 17, but through the retaining finger 18b (a further retaining finger is situated in front of the drawing plane). The retaining or latching finger 18b is formed to be resiliently elastic and extends with its end-side end through a latching opening 18h in the assembly support 2, with the latching lug 18e engaging behind the end side of the assembly support 2 and thereby fixing the intermediate bracket 18 in the x direction. It can be clearly seen from said diagrammatic illustration that the latching finger 18b with its latching lug 18e can be raised upward (in the z direction) slightly, resulting in the latching action being released, and can be pushed out rearward (counter to the direction of travel). This makes the upper radiator mount 12 accessible from the front, that is to say from the front side of the front end module, and makes it possible for the radiator (or the entire cooling module) to be dismounted by tilting it backward and removing it upward. The accessibility from the front can also be seen in FIG. 2, which illustrates the latching elements 11a, 12a, which correspond to the latching lugs 18e.

The diagrammatic illustration in FIG. 6 also shows that the rubber bush 19 is fixed in the fastening eye 18a in a positively locking manner in the upward and downward z directions. The rubber bush 19 thereby forms a captive part of the intermediate bracket 18.

Figure 7A:
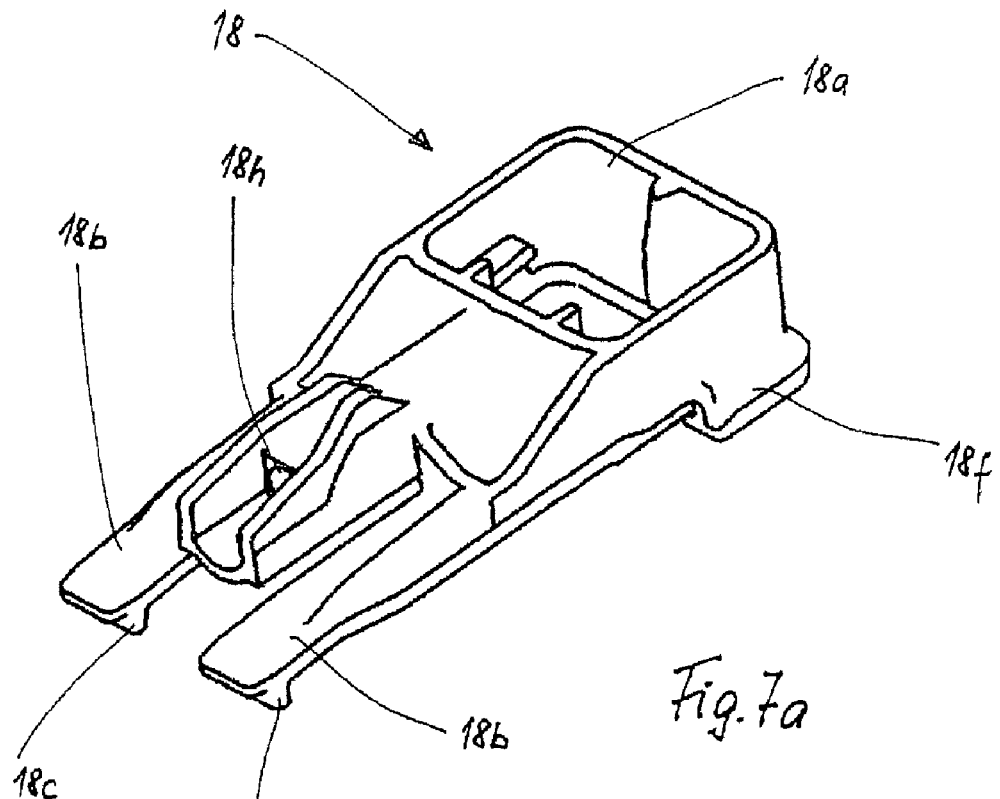
FIGS. 7a and 7b are perspective illustrations of the intermediate bracket.
Figure 7B:
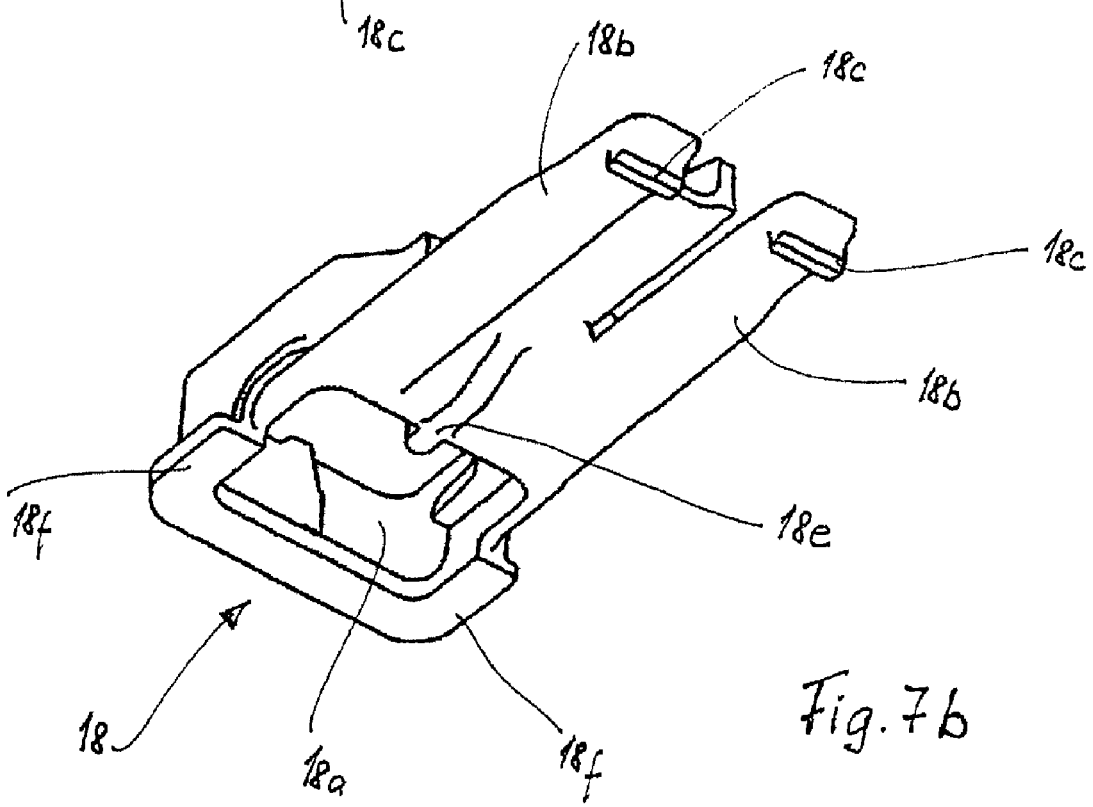

FIGS. 7a and 7b are two different perspective illustrations of the intermediate bracket 18 with two retaining fingers 18b and a fastening eye 18a, into which the rubber bush 19 is inserted in a captive manner (not illustrated here). The downwardly projecting latching lugs 18c in FIG. 7b can be clearly seen at the free ends of the retaining fingers 18b. The flange 18f arranged at both sides of the fastening eye 18a can also be seen. The support lug 18e can be clearly seen from FIG. 7b, and is situated in the direct vicinity of the fastening eye 18a. In addition, the auxiliary bore 18h (cf. FIG. 4) is arranged between the two retaining fingers 18b, which auxiliary bore 18h serves to hold a screw for an auxiliary fastening. The illustrated intermediate bracket 18 can be produced as a plastic injection-molded part and is dimensioned so as to be able to absorb, and transmit into the assembly support, the occurring mount forces.

In the illustrated and described exemplary embodiment, the assembly support 2 is formed as a closed frame with two transverse members and two side parts. In an embodiment which is not illustrated, the assembly support can also be formed as a U-shaped, that is to say open frame having an upper transverse member and two side struts. In said case, the lower mounts of the heat exchanger or radiator are attached to the two side struts.

LIST OF REFERENCE SYMBOLS

1 Front end module
2 Assembly support
2a Upper transverse member
2b Lower transverse member
2c Side part
2d Side part
2e Rib
2g Rib
2f Rib
2h Latching opening
3 Coolant radiator
4 Coolant tank, left
5 Coolant tank, right
6 Radiator mesh
7 Fan cowling
8 Fan impeller
9 Lower radiator mount, left
10 Lower radiator mount, right
11 Upper radiator mount, left
11a Latching element
12 Upper radiator mount, right
12a Latching element
13 Condenser
14 Mount opening
15 Rubber bush
15a Receiving opening
15b Flange
16 Mounting pin, lower
16a Stop plate
17 Mounting pin, upper
18 Intermediate bracket
18a Fastening eye
18b Retaining finger
18c Latching lug
18d Stop face
18e Support lug
18f Flange
18g Collar
19 Rubber bush
19a Flange
19b Slot

The invention claimed is:

1. A device for fastening a heat exchanger in an assembly support of a front end module for a motor vehicle, with the assembly support having an upper transverse member and two side parts, and the heat exchanger having a plurality of mounts which are elastically supported on the assembly support, and with mounting pins being arranged on the heat exchanger, which mounting pins are held in elastically deformable bushes, wherein two upper mounts have intermediate brackets which at one side enclose the bushes and at the other side can be fastened to the assembly support without further auxiliary means, wherein the intermediate bracket is one piece and has a fastening eye comprising a closed ring structure, for holding the elastically deformable bush in a positively locking manner, and at least one retaining finger which is detachably connected and can be latched or clamped to the assembly support; wherein the at least one retaining finger projects approximately perpendicularly from the mounting pin and extends through an opening arranged in a front side of the assembly support.

2. The device as claimed in claim 1, wherein the intermediate bracket has two resiliently elastic retaining fingers which are arranged adjacent to one another and have end-side latching lugs which extend through and engage behind two front-side openings, the end-side latching lugs extending perpendicular to a surface of the resiliently elastic retaining fingers upon which the end-side latching lugs are disposed.

3. The device as claimed in claim 2, wherein the intermediate bracket has an auxiliary bore for an auxiliary fastening fail-safe between the retaining fingers.

4. The device as claimed in claim 1, wherein the intermediate bracket is supported at a top and at a bottom in a z direction relative to the assembly support by means of clamping.

5. The device as claimed in claim 1, wherein the bush in the intermediate bracket has a slot which holds the mounting pin and permits a degree of play of the mounting pin transversely with respect to a direction of travel.

6. The device as claimed in claim 1, wherein the fastening eye of the intermediate bracket has a lateral flange which is supported at a top of the lateral flange in a z direction against ribs of the upper transverse member.

7. The device as claimed in claim 1, wherein the intermediate bracket can be produced as a plastic injection-molded part.

8. The device as claimed in claim 1, wherein lower mounts are embodied as fixed mounts which are elastic in a z direction, and the upper mounts are embodied as floating mounts in the z direction.

9. The device as claimed in claim 8, wherein the mounting pins in the bushes of the upper mount have a degree of play in the z direction.

10. The device as claimed in claim 1, wherein the heat exchanger comprises a coolant radiator.

11. The device as claimed in claim 1, wherein the assembly support further comprises a lower transverse member.

12. The device as claimed in claim 1, wherein the number of mounts is four.

13. The device as claimed in claim 1, wherein the closed ring structure has a substantially rectangular cross section.

14. The device as claimed in claim 1, wherein the intermediate bracket has a support lug extending from an inside surface of the closed ring structure.

* * * * *